3,444,201
PROCESS FOR PREPARING PHENYLALKYL-
AMINES BY CATALYTIC HYDROGENATION
OF AZIRIDINES
George E. Ham, Lake Jackson, and Prella M. Phillips,
Angleton, Tex., assignors to The Dow Chemical Company, Midland, Mich., a corporation of Delaware
No Drawing. Filed Dec. 18, 1964, Ser. No. 419,564
Int. Cl. C07c 85/10, 85/00
U.S. Cl. 260—570.8         5 Claims

ABSTRACT OF THE DISCLOSURE

A method of preparing secondary amines by selective catalytic hydrogenation of an N-substituted aziridine compound in the presence of a rhodium catalyst.

---

This invention relates to a method of preparing secondary amines by selective catalytic hydrogenation of an N-substituted aziridine compound.

The hydrogenation of N-substituted aziridinyl compounds containing a cyano group using Raney nickel as the catalyst has been reported by Bestian in Ann. Chemie, vol. 566, pp. 210–244 (1950). The hydrogenation of N-substituted aziridines which contain a sulfonyl group is disclosed by Kharasch et al. in J. Amer. Chem. Soc., 61, 3425 (1939). The selective hydrogenation of N-alkenyl aziridine compounds without cleavage of the aziridine ring is disclosed in copending U.S. patent application Ser. No. 373,487 and now U.S. Patent No. 3,242,165.

It has now been found that N-substituted aziridine compounds wherein the substituent which is bonded to the nitrogen atom of the aziridine ring is an aralkyl group may be converted to a secondary amine (containing an aralkyl group) by contacting the N-substituted aziridine compound with hydrogen in the presence of a rhodium catalyst.

The selective hydrogenation reaction upon which the process of the invention is based may be represented by the following equation:

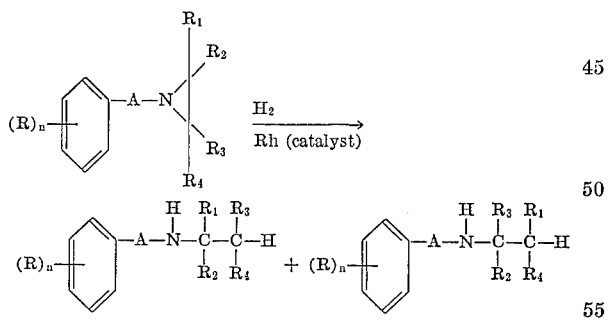

wherein $n$ is an integer of from 0 to 5, each R (which may be the same or different) may be a lower alkyl group of from 1 to 4 carbon atoms (such as methyl, ethyl, n-propyl, i-propyl, n-butyl, i-butyl, sec.-butyl and tert.-butyl) replacing a hydrogen atom of the benzene nucleus, A represents a divalent alkylene group of from 1 to 4 carbon atoms (such as a —$CH_2$—, —$CH_2CH_2$—,

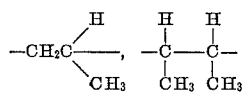

or $(CH_2)_4$) and each of $R_1$, $R_2$, $R_3$ and $R_4$ are independently selected from the group consisting of the hydrogen atom and a lower alkyl group. Carbon atoms of the benzene nucleus which are not bonded to lower alkyl groups are bonded to hydrogen atoms. Typical embodiments of the process of the invention include the following reactions:

(1)
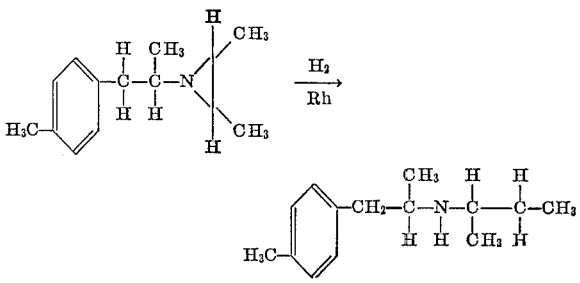

(2)
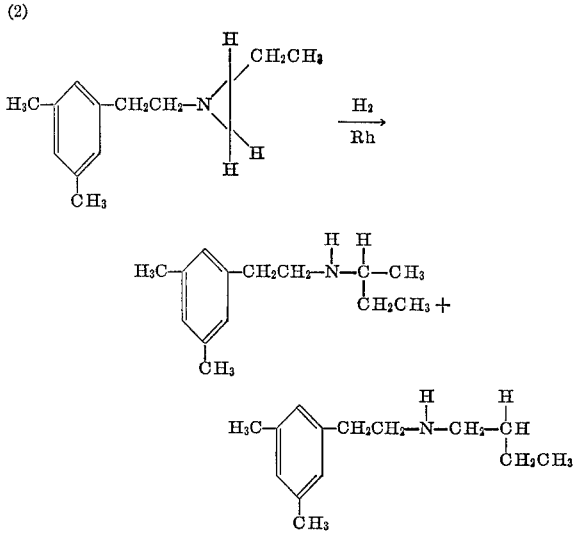

(3)
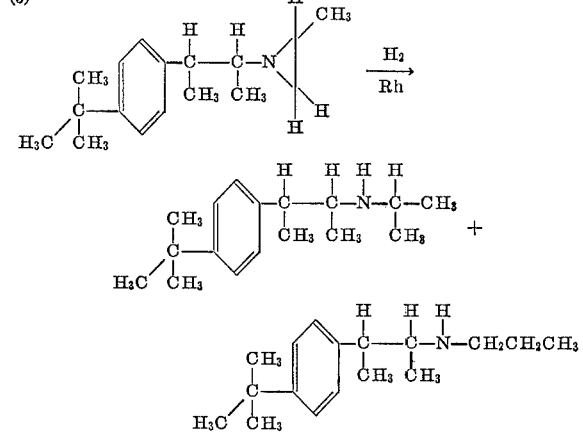

(4)
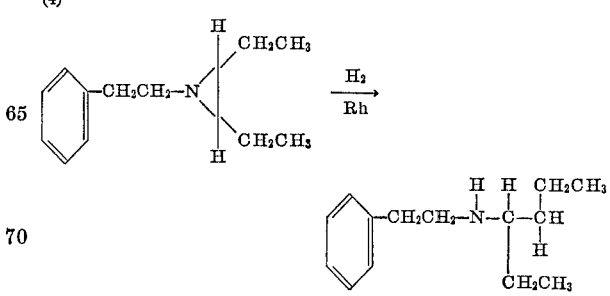

(5) 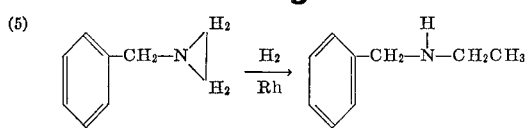

The process of the invention may be carried out by placing the N-aralkyl aziridine compound in a suitable pressure vessel with a catalytic amount of rhodium metal (supported or unsupported) and maintaining the mixture at a temperature of from about 95°–100° to to 250° C. in the presence of hydrogen for a time sufficient to hydrogenate the aziridine ring. Reaction times of up to 24 hours may be used. At higher temperatures, shorter reaction times may be employed. For example, when the hydrogenation reaction is carried out at temperatures of from about 210°–220° C. under a hydrogen pressure of about 1200 p.s.i.g., 90 percent yields based on the initial charge of aziridinyl compound are obtained in approximately one hour. Better yields are obtained using higher temperature and pressure. The selective hydrogenation is preferably conducted at superatmospheric pressures (a hydrogen pressure of from about 1000 p.s.i.g. to 2000 p.s.i.g. is ordinarily satisfactory). Only a catalytic amount of rhodium is required. The rhodium may be in the form of a rhodium compound (such as an oxide) which is reduced to the metal prior to or during hydrogenation. Any inert catalyst support (such as silica, alumina, etc.) may be used. Alumina is a very satisfactory support material. Finely divided rhodium metal is a preferred form of the catalyst. When rhodium is employed as the catalyst, amounts of up to about 15 percent by weight of rhodium metal (based upon the combined weight of rhodium and N-aralkyl aziridine compound which is to be hydrogenated) may be used. Preferably, an amount of rhodium metal catalyst equal to from 0.001 to 1.0 percent by weight of the N-aralkyl aziridine compound is used.

The hydrogenation reaction of the present invention results in ring-opening of the aziridine ring without either substantial reduction of the aromatic nucleus or extensive cleavage of the aralkyl-nitrogen bond. The reaction may be carried out using a suitable inert solvent. The use of a solvent, however, usually requires an extra separation step, since the amine product of the hydrogenation reaction must then be removed from the solvent.

A preferred embodiment of the process of the invention comprises contacting an N-substituted aziridine (such as N-phenethyl aziridine) with hydrogen under a pressure of about 1000–1300 p.s.i.g. at a temperature of from 180° to 220° C. in the presence of a rhodium on alumina catalyst (4–6 percent by weight of rhodium metal on alumina). The hydrogenation is usually complete in from 1 to 2 hours under these conditions and yields (based upon the amount of N-aralkyl aziridine charged to the reactor) of about 90 percent have been obtained. Although temperatures above 250° C. may be used to carry out the reaction, several components other than the desired secondary amine are formed and the catalyst selectivity diminishes.

The secondary amines produced according to the process of the invention are useful as curing agents for epoxy resins (such as condensation products of bisphenol-A and epichlorohydrin).

The following examples are submitted for the purpose of illustration only and are not to be construed as limiting the scope of the invention in any way.

Examples I–III—General method

A stainless steel pressure vessel (capacity approximately 1410 milliliters) was charged with .318 mole (46.8 grams) of N-phenethyl aziridine and 0.5 gram of alumina powder containing 5 percent by weight of rhodium (95 grams of $Al_2O_3$ per 5 grams of rhodium metal).

No solvent was employed. The charged pressure vessel was placed in a rocker and heated to the desired temperature. Hydrogen was then added to the vessel under pressure and the temperature controlled until hydrogen uptake ceased. The results are summarized in Table 1.

TABLE 1

| Example No. | Temp. (° C.) | Hydrogen pressure (p.s.i.g.) | Percent yield of N-phenethyl ethylamine (based on the amount of N-phenethyl aziridine charged to the reactor) | Time (hours-minutes) |
|---|---|---|---|---|
| I | 96–101 | 1,050 | 5 | 19–25 |
| II | 146–150 | 1,015 | 80 | 19–26 |
| III | 194–214 | 1,200 | 90 | 1–22 |

Analysis of the product of Example III gave the following results (all percentages by weight)—Theoretical for N-phenethyl ethylamine ($C_{10}H_{15}N$): C, 81.03; H, 9.52; N, 9.45. Found by analysis: C, 80.41; H, 10.13; N, 9.25.

The tertiary nitrogen content of the product was less than 0.01 percent by weight.

Similar results are obtained when 1-(3-phenylpropyl) aziridine

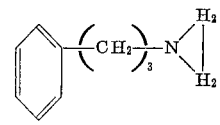

is contacted with hydrogen in the presence of a rhodium metal catalyst at a temperature of from 180° to 220° C. under a hydrogen pressure of from about 1000 to 1300 p.s.i.g. to produce N-(3-phenylpropyl)ethylamine.

We claim as our invention:

1. A method of preparing secondary amines of the formula

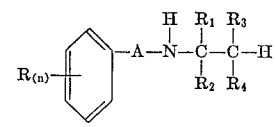

wherein $n$ is an integer of from 0 to 5, each R is a lower alkyl group of from 1 to 4 carbon atoms, A represents an alkylene group of from 1 to 4 carbon atoms, and each of $R_1$, $R_2$, $R_3$ and $R_4$ is hydrogen or a lower alkyl group, which comprises reacting by contacting at 95°–250° C., and in the presence of rhodium as a catalyst, hydrogen with an aziridine compound of the formula

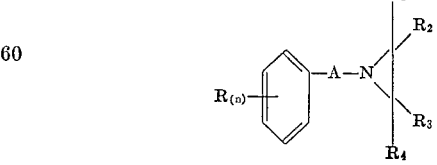

wherein each of R, $R_1$, $R_2$, $R_3$ and $R_4$ are as defined above.

2. The method of claim 1 wherein the reaction is carried out at a temperature of from 95° to 250° C. under a hydrogen pressure of from 1000 to 2000 p.s.i.g.

3. The method of claim 2 wherein the temperature is from 180° to 220° C.

4. A method of preparing N-(3-phenylpropyl)-ethylamine which comprises contacting 1-(3-phenylpropyl)-aziridine with hydrogen at a temperature of from 180° to 220° C. under a pressure of from 1000 to 1300 p.s.i.g. in the presence of a rhodium metal catalyst.

5. A method of preparing N-phenethyl ethylamine which comprises contacting N-phenethyl aziridine with hydrogen at a temperature of from 180° to 220° C. under a pressure of from 1000 to 1300 p.s.i.g. in the presence of from .001 to 1.0 percent by weight of rhodium metal based on the total weight of said N-phenethyl aziridine and rhodium.

References Cited

Kharasch et al.: "Journal American Chemical Society," vol. 61, pages 3425–32 (1939). QDIA5.

ROBERT V. HINES, *Primary Examiner.*

U.S. Cl. X.R.

252—460, 466, 472; 260—47, 239, 570.9